W. L. & G. H. FOSTER.
RESILIENT MOUNTING FOR WHEELS.
APPLICATION FILED JAN. 18, 1911.
1,037,229.
Patented Sept. 3, 1912.
3 SHEETS—SHEET 2.
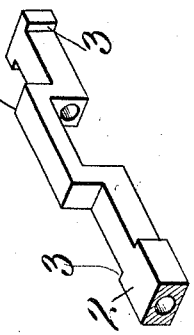
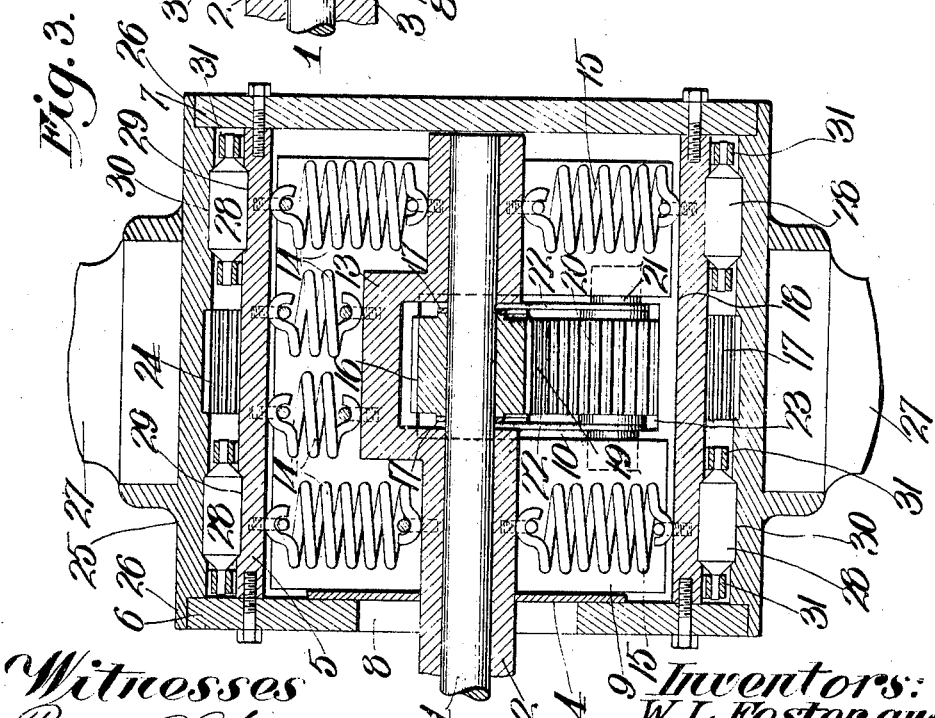

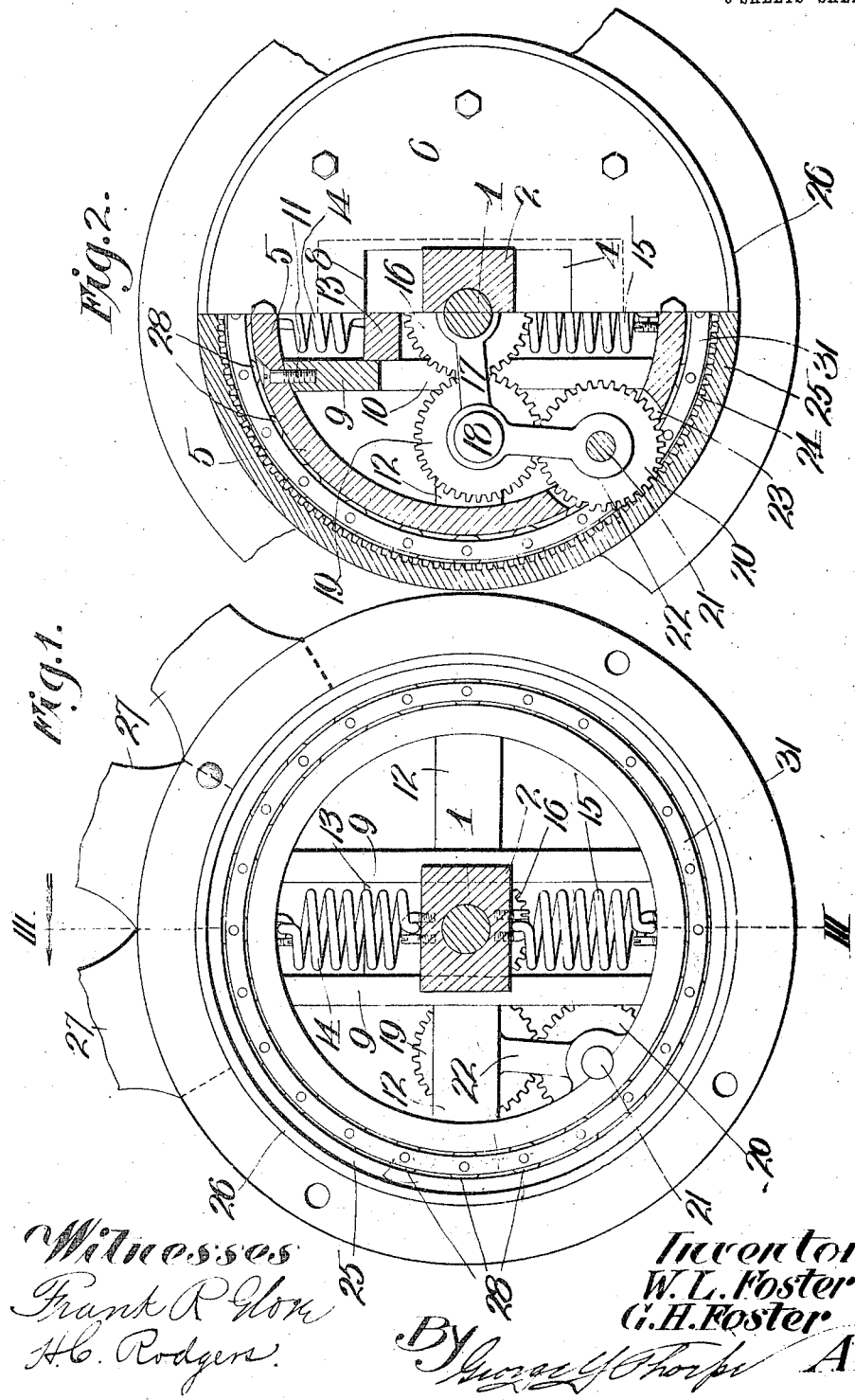

W. L. & G. H. FOSTER.
RESILIENT MOUNTING FOR WHEELS.
APPLICATION FILED JAN. 18, 1911.
1,037,229.
Patented Sept. 3, 1912.
3 SHEETS—SHEET 3.
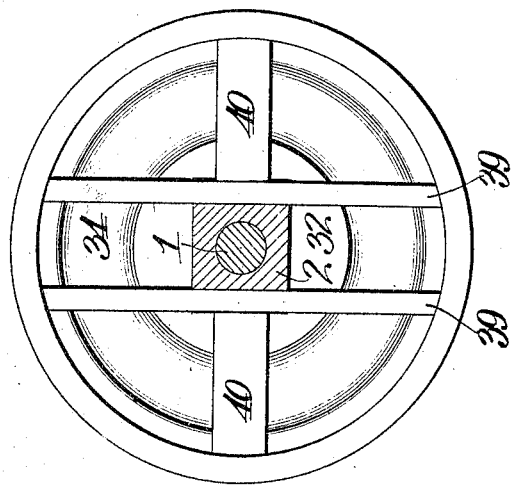
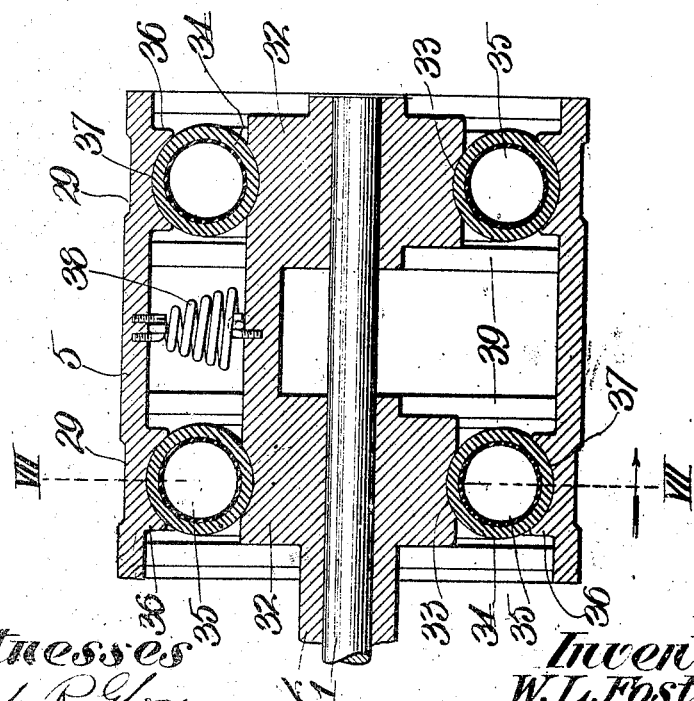

UNITED STATES PATENT OFFICE.

WILLIAM LEE FOSTER AND GEORGE H. FOSTER, OF KANSAS CITY, MISSOURI.

RESILIENT MOUNTING FOR WHEELS.

1,037,229.  Specification of Letters Patent.  Patented Sept. 3, 1912.

Application filed January 18, 1911. Serial No. 603,770.

*To all whom it may concern:*

Be it known that we, WILLIAM LEE FOSTER and GEORGE H. FOSTER, citizens of the United States, residing at Kansas City, in the county of Jackson and State of Missouri, have invented certain new and useful Improvements in Resilient Mountings for Wheels, of which the following is a specification.

This invention relates to resilient mountings for wheels and has for its primary object to produce a mounting of this character whereby the wheel is given the capacity for absorbing shocks and jars incident to travel over roads more or less irregular or rough without danger of puncture or injury through contact with nails or other points or sharp objects over which the wheel may pass.

With this general object in view and others as hereinafter appear, the invention consists in certain novel and peculiar features of construction and organization as hereinafter described and claimed; and in order that it may be fully understood reference is to be had to the accompanying drawings, in which—

Figure 1, is a view of the inner side of the central portion of a vehicle wheel embodying our invention, the inner face plate and the dust guard wheel being omitted and the driving shaft or axle and the sleeve being shown in section. Fig. 2, is a view of the same side of the wheel with one half of the wheel in elevation and half in central vertical section and certain gear wheels and their supports in elevation. Fig. 3, is a central vertical section of the wheel on the line III—III of Fig. 1. Fig. 4, is a horizontal section of the central portion of the wheel. Fig. 5, is a detail perspective view of a part of the sleeve on a reduced scale. Fig. 6, is a central vertical section of a modified construction of the inner portion of the wheel. Fig. 7, is a vertical section on the line VII—VII of Fig. 6, with one of the pneumatic cushions in elevation.

In the said drawings, 1 indicates the driving shaft or axle journaled in the axle sleeve or casing 2, the ends of which (only one appearing) are of a rectangular form in cross section. Near each end the sleeve is laterally narrowed to provide shoulders 3 facing each other and secured upon the sleeve against the shoulders which face outward is a dust guard 4.

5 indicates a cylindrical skein, surrounding the end of the shaft, and closed at its ends by a pair of disks 6 and 7, the former having a rectangular opening 8 through which the sleeve 2 projects, the opening being of considerably greater length vertically than the depth of the sleeve and of substantially the same width so that the skein shall be incapable of lateral play or turning movement on the sleeve, the area of the opening being less than that of the dust guard which fits snugly against the inner side of disk 6 to prevent dust entering the skein.

9 indicates a pair of vertical partitions for the hub, fitting snugly against opposite sides of the sleeve 2 and bearing at their inner edges against dust-guard 4 and at their outer edges against the inwardly-facing shoulders 3, as shown clearly in Fig. 4, and said partitions are provided centrally with notches 10, which extend from a point adjacent to the upper side of the sleeve, to their lower edges.

11 are screw bolts extending inwardly through the cylindrical portion of the skein into the upper and lower ends of the partitions, and the latter are secured against bending movement by horizontal struts or braces 12, these struts or braces being bolted to the partitions as shown in Fig. 4, and secured at their outer ends in any suitable manner to the skein 5. Centrally of the skein the sleeve 2 is arched as at 13, for a purpose which hereinafter appears, and to form a substantial support for the said sleeve, a series of retractile springs 14 are connected at their upper ends to the upper portion of the skein and at their lower ends to the sleeve, these springs being adapted to hold the vehicle when unloaded, with the axle or shaft slightly above the center of the skein. These springs are also adapted to offer yielding resistance to undue upward movement of the shaft. Similar springs 15 underlie the sleeve and connect the same with the lower part of the cylindrical portion of the skein and are adapted primarily to coöperate with springs 14 in resisting undue upward movement of the axle or shaft but being weaker than springs 14, permit the latter to hold the vehicle when unloaded, with its axle above the center of the skein as explained. Springs 15 are also adapted to offer yielding resistance to excessive downward movement. It will thus be seen that the springs coöperate in guarding against excessive vertical vibrations of the axle of the vehicle.

Secured rigidly on the axle within the opening formed by arch 13 of the sleeve is a gear pinion 16, and pivoted on the shaft or axle at opposite sides of said pinion is a pair of links 17 forming journals for the spindle 18 of the gear wheel 19, meshing with pinion 16 and adapted to transmit motion from the latter to a gear wheel 20. The spindle 21 of wheel 20, is journaled in a pair of lugs 21ª of skein 5, and in the lower ends of a pair of links 22 pivoted at their upper ends on the spindle 18 of wheel 19, the links 17 and 22 constituting a pivotal connection whereby the wheels are maintained reliably in the relation described, it being noted in this connection by reference to Fig. 2, that the gear wheel 20 projects through an opening 23 in the cylindrical portion of the skein and meshes with the internal gear teeth 24 of a hub 25, fitting snugly between disks 6 and 7, and concentrically surrounding the skein, the hub being provided with outwardly projecting flanges 26 peripherally engaging said disks to render it difficult for dust to enter the hub, and radiating from said hub and secured to the same in any suitable manner are the wheel spokes 27. At opposite sides of the toothed portion 24 of the hub and between the same and the skein, are rollers 28, the same tracking in the grooves 29 in the skein and grooves 30 in the hub, these grooves or tracks serving to prevent endwise movement of the rollers. To maintain adjacent rollers of each set uniform distances apart, their ends or spindles are journaled in circular rings or cages 31.

In practice, only the drive wheels of a vehicle will ordinarily be provided with the gear wheels described, and in other respects the construction of all of the wheels will be identical so that the parts may be interchangeable, it being obvious of course that in the wheels which are not employed as drive wheels, the arched portion of the sleeve 2 and the internal teeth of the hub will be functionless. In both cases the outer portion of the wheel, including the cages and rollers, will travel around the skein in an obvious manner and the weight of the vehicle will be sustained by the springs 14, the latter yielding slightly under augmentation of the load, and during the travel of the machine the vehicle body including the axle and the sleeve 2, will vibrate vertically. The dust guard will keep the opening 8 covered at all times, and in the drive wheels the rotation imparted to the axle or shaft will, through the medium of the pinion 16 and gear wheels 19 and 20, impart rotation to the outer portion of the wheel.

In the construction shown by Figs. 6 and 7, the sleeve 2 is formed with circular enlargements 32 having peripheral grooves 33 as seats for the surrounding pneumatic cushions 34, which cushions are preferably provided with inner tubes 35 whereby they may be inflated under the pressure desired. The skein is also provided with inwardly projecting ribs 36, formed with grooves 37 to receive the outer portions of the pneumatic cushions, which tend to hold the axle centrally within the skein, and in order that the vehicle when unloaded may be sustained at substantially the height mentioned in connection with the preceding figures, that is with the axis of the axle above the axis of the skein, a conical retractile spring 38 connects the upper part of the sleeve 2 with the upper part of the skein.

In lieu of the partitions 9 to guide the axle and sleeve in their vertical movements, a series of uprights 39 are secured in the skein at opposite sides of the sleeve and also against opposite faces of the enlargements 32, and braces 40 corresponding to braces 12, are interposed between each upright and the adjacent side of the stationary hub.

From the above description it will be apparent that we have produced a resilient wheel embodying the desirable features of an ordinary pneumatic tired wheel and that the construction shown in Figs. 6 and 7 is nonpuncturable under ordinary conditions of service, in fact being wholly, inclosed within the skein, it is inaccessible to a person who, through malicious or other motives, might attempt to puncture one of the pneumatic cushions.

We claim:

1. In a device of the character described, a skein, a sleeve projecting into the skein and adapted for vertical but not rotatable movement, a shaft or axle projecting into the skein and journaled in said sleeve, means within the skein engaging the same and said sleeve and yieldingly supporting the latter and the shaft or axle in such position that it shall be possible for said parts to play in a vertical plane above and below the axis of the skein, a hub spaced from and concentrically surrounding the skein and provided with internal gear teeth, anti-friction bearing devices interposed between the skein and hub, a gear wheel journaled on the skein and engaging the said internal gear teeth and projecting into the skein, a gear pinion secured on the shaft or axle, an intermediate gear wheel meshing with the gear pinion and the first-named gear wheel, and means for maintaining said gear wheels and gear pinion in engagement irrespective of changes in position between the shaft or axle and the skein.

2. In a device of the character described, a skein having an opening in its inner end, a sleeve projecting into the skein through said opening and adapted for vertical but not rotatable movement, a shaft or axle projecting into the skein through said opening and journaled in said sleeve, a dust guard secured to the sleeve within the skein and covering the said opening and bearing against the end of the skein containing said opening, means within the skein engaging the same and said sleeve and yieldingly supporting the sleeve and the shaft or axle in such position that it shall be possible for said parts to have play in a vertical plane above and below the axis of the skein, a hub spaced from and concentrically surrounding the skein and provided centrally with internal gear teeth, a gear wheel journaled on the skein and engaging the gear teeth of the hub and projecting into the skein, a gear pinion secured on the shaft or axle, an intermediate gear wheel meshing with the gear pinion and the first-named gear wheel, and links pivotally connecting said gear wheels and gear pinion to maintain them in operative relation and permit them to accommodate up and down movement of the shaft or axle.

3. In a device of the character described, a skein having an opening in its inner end, and an opening in its circumferential portion, a sleeve projecting into the skein through said first-named opening, and adapted for vertical but not rotatable movement, said sleeve centrally within the skein having an arched portion, a shaft or axle projecting into the skein through said end opening, and journaled in said sleeve, a dust guard secured to the sleeve within the skein and covering said end opening and bearing against the end of the skein containing said opening, means within the skein engaging the same and said sleeve and yieldingly supporting the sleeve and shaft or axle in such position that it shall be possible for said parts to have play in a vertical plane above and below the axis of the skein, a hub journaled on the skein and provided with internal gear teeth, a pinion secured on the shaft or axle under the arched portion of said sleeve, a gear wheel arranged in the circumferential opening of the skein and journaled upon the latter and engaging the internal teeth of the hub, an intermediate gear wheel meshing with the gear pinion and with the gear wheel engaging the teeth of the hub, links pivoted to the shaft or axle and forming a journal for the said intermediate gear wheel, and links pivotally connecting the axle of the said intermediate gear wheel and the gear wheel engaging the teeth of the said hub.

In testimony whereof we affix our signatures, in the presence of two witnesses.

WILLIAM LEE FOSTER.
GEORGE H. FOSTER.

Witnesses:
 HELEN C. RODGERS,
 G. Y. THORPE.